Jan. 28, 1941.  T. J. APPLETON  2,229,788
DUAL CRANKSHAFT ENGINE
Filed March 14, 1939      4 Sheets-Sheet 1

Fig.1

INVENTOR.
Thomas Jay Appleton
BY
Robert L. Rockwell
ATTORNEY.

Jan. 28, 1941.　　　　T. J. APPLETON　　　　2,229,788
DUAL CRANKSHAFT ENGINE
Filed March 14, 1939　　　4 Sheets-Sheet 2

INVENTOR.
Thomas Jay Appleton
BY
Robert L. Rockwell,
ATTORNEY.

Jan. 28, 1941.　　　　T. J. APPLETON　　　　2,229,788
DUAL CRANKSHAFT ENGINE
Filed March 14, 1939　　　　4 Sheets-Sheet 3

INVENTOR.
Thomas Jay Appleton
BY Robert L. Rockwell
ATTORNEY.

Jan. 28, 1941.  T. J. APPLETON  2,229,788
DUAL CRANKSHAFT ENGINE
Filed March 14, 1939  4 Sheets-Sheet 4

INVENTOR.
Thomas Jay Appleton
BY
ATTORNEY.

UNITED STATES PATENT OFFICE 2,229,788

DUAL CRANKSHAFT ENGINE

Thomas Jay Appleton, Seattle, Wash.

Application March 14, 1939, Serial No. 261,793

10 Claims. (Cl. 74—51)

This invention relates to internal combustion engines in general, and in particular to new and useful improvements in multiple cylinder engines comprising dual oppositely rotated crankshafts.

Dual crankshafts actuated by two connecting rods per piston, heretofore have been devised for internal combustion engines to reduce the sidewall friction between pistons and cylinder walls caused by the angular displacement of the connecting rods in conventional single-crankshaft engines, and to balance the transverse vibration forces that cannot be compensated for by crankshaft balance weights in said engines. Synchronization of the dual crankshafts in the past has been accomplished by means of a pair of intermeshing gears of equal size fixedly secured to the ends of the respective crankshafts.

Although successful in reducing the aforesaid side-wall friction and transverse vibration, prior dual crankshaft engines have been found to be impracticable largely because of the noise and inherently high pitch-line velocity of the synchronizing gears, which limit the crankshaft speeds to relatively low values. Said gears, therefore, prevent the operation of such engines at those higher speeds at which normal fuel and weight economies may be had. Furthermore, the structural arrangement of parts has necessitated the use of two connecting rods of substantially the same length as those of conventional engines of comparable size. Each dual connecting rod may be made somewhat lighter than that for said conventional engine, but their combined greater weight imposes inertia forces in the reciprocating system that actually increase the amount of vertical vibration and necessitate speed limitations independent of said synchronizing gears.

My invention resides in an improved combination of co-acting parts for each cylinder of dual crankshaft engines. It comprises a slender lightweight piston tube fixedly secured at one end to a short piston and provided at its other end with an internal guide bearing, a guide element for said guide bearing fixedly secured at its lower end to a base structure supported by the crank housing, a light-weight yoke for dual wrist pins disposed medially of the exterior of said guide tube and fixedly secured thereto, and a pair of short connecting rods, preferably equal in length to the stroke of the piston, for connecting said wrist pins with the dual crankshafts.

By reason of the aforesaid improvements the connecting rods, during the power stroke of the engine, constitute in effect a toggle mechanism that exerts two outwardly directed forces on the dual cranks of the crankshafts. The sum of said forces in the connecting rods is much greater than the downward force produced by the ignited fuel charge and transmitted by the piston through the piston tube to the wrist pins. This advantage will be apparent to those familiar with toggle mechanisms in view of the small angle between a line through said cranks and the center line of effort of each connecting rod. The resulting torque values produced by this toggle-like disposition of the short connecting rods, in comparison with the corresponding torque values of a conventional engine of equal bore and stroke, are found to be substantially increased during the medial portions of the power stroke while the cylinder pressures are high, and are found to be materially decreased during the latter portions of the compression stroke while the power is being derived from the momentum of the moving parts.

There is, therefore, a decided increase in the comparable mechanical advantage of the co-acting elements I have devised during those parts of the power and compression strokes when most effective in increasing the torque output of the engine. For a given bore and stroke, the crank throws and connecting rods are shorter and the reciprocating elements are lighter than in the conventional engine, hence, in addition to the aforesaid increase in mechanical advantage, they reduce the vibration and permit operation at the higher crankshaft speeds that make possible normal fuel and weight economies.

The arrangement and proportions of the aforesaid co-acting elements automatically compensate for reasonable differences in the lengths of the connecting rods for a given cylinder due to wear, thus assuring the transmission of components of the piston force to both crankshafts.

Said co-acting elements of the invention also function in multiple-cylinder engines to synchronize the dual crankshafts, and to transmit power from one of the dual crankshafts to the other; thus enabling the entire output of the engine to be derived from either of said shafts, and obviating the necessity for the objectionable speed-limiting synchronizing gears heretofore required in engines employing two crankshafts.

An object of the invention is to provide improvements in the construction of dual crankshaft engines whereby shorter crank throws and connecting rods may be employed for a given length of stroke.

A second object is to provide a dual crankshaft engine having improved torque characteristics.

A third object is to provide an improved engine of the kind described that will operate at higher crankshaft speeds for a given bore and stroke, thereby reducing the weight required for a given horse power rating.

A fourth object is to provide an improved engine of the kind described in which differences in the lengths of the dual connecting rods due to wear are automatically compensated for in the linkage mechanism.

A fifth object is to provide an improved multiple-cylinder engine of the kind described having improved means for synchronizing the dual crankshafts thereof and for transferring power from one said shaft to the other.

Other objects and advantages will be apparent to those skilled in the art from the following detailed description of a preferred form of the invention, which consists of certain parts in cooperative combination, that are hereinafter described, illustrated in the accompanying drawings and embraced in the appended claims.

In the drawings:

Fig. 5a is a diagrammatic representation of the piston, connecting rod and crank positions of the engine illustrated in Fig. 1;

Fig. 5b is a diagrammatic representation of the movable elements of the aforesaid engine when the cranks are the same angular distances from top dead center during the up stroke, as those illustrated in Fig. 5a;

Fig. 6 also is representative of the first three cylinders of the six-cylinder engine shown in Fig. 2;

Like reference numerals are used to indicate like parts throughout the several figures of the drawings in which is illustrated a multiple-cylinder four-cycle engine incorporating the improved construction.

*Basic construction*

In addition to the co-acting elements that constitute the invention proper, said engine comprises a plurality of other basic parts that are similar to those of a conventional four-cycle engine of comparable bore and stroke, but decidedly modified as to proportions. These basic parts of the engine will be described first.

Referring particularly to Figs. 1 to 4, inclusive, it will be seen that the engine comprises a crank case or housing 15, that carries dual crankshafts 16a and 16b having cranks 16a' and 16b', respectively, rotatively positioned in suitable main bearings 17a and 17b, respectively, preferably made integral with crank housing webs 15w which may be reinforced by ribs 15r and flanges 15f, bearing caps 18 and stud bolts and nuts 19 being used to hold said crankshafts in position. Support flanges 15s, provided at the bottom of the crank housing and reinforced by a plurality of ribs 15m, are adapted to support the engine, which may be fixedly secured to the support elements, not shown, by means of suitable bolts passing through holes 15h.

Figure 1:
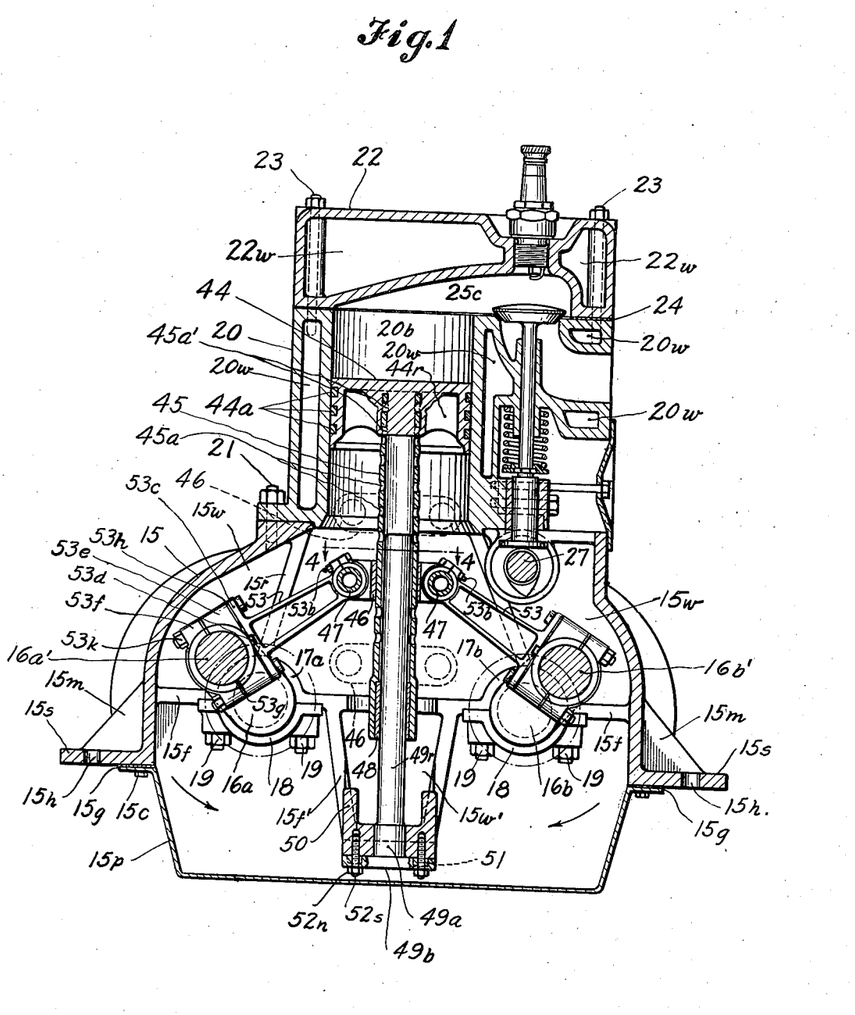
Figure 1 is a transverse sectional elevation of a multiple-cylinder internal combustion engine comprising the invention, the same being taken medially of the cylinder and one of the valves as indicated by broken line 1—1 of Fig. 2.

Cylinder block 20 may be fixedly secured to the aforesaid crank housing by means of a plurality of studs and nuts on each side of the cylinder block, one of which is indicated by the numeral 21 in Fig. 1. Cylinder head 22 is fixedly secured to the cylinder block by means of studs and nuts 23, the conventional gasket 24 being used to assure a tight joint.

A cylinder bore 20b is provided for each pair of crank throws of the crankshafts, and water for cooling purposes is provided in the usual manner in water jacket spaces 22w in the cylinder head and 20w in the cylinder block.

Figures 2, 4:
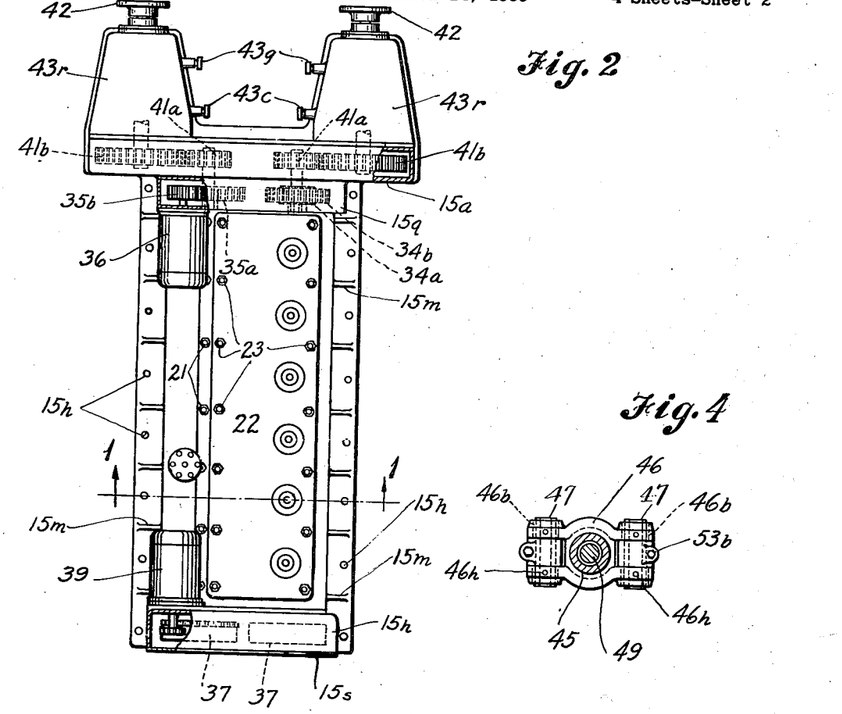
Fig. 2 is a plan view of said engine shown fitted with reduction gearing for the operation of twin screw propeller shafts controllable through the intermediacy of a pair of reverse gear units for power boats to a smaller scale than that of Fig. 1.
Fig. 4 is a plan view of the piston-tube yoke for the upper end of the connecting rods, with a section through the piston tube taken on broken line 4—4 of Fig. 1.

Fig. 2 illustrates an extension 15q of the crankshaft housing which may be used to provide space for gear 34a on crankshaft 16b and gear 34b on cam shaft 27, also gear 35a on crankshaft 16a and gear 35b of the usual electric generator 36. Extension 15h of said housing and cover plate 15s may be used to enclose fly wheels 37 provided at the other end of each crankshaft.

In Fig. 2 it will be seen that each crankshaft is provided at the end opposite the fly-wheel with a pinion 41a that meshes with a large gear 41b for the purpose of reducing the high engine speed to a lower speed suitable for the more efficient operation of twin propeller screws mounted at the extremity of suitable propeller shafts, not shown, adapted to be fixedly secured to power take-off flanges 42, through the intermediacy of two standard clutch and reverse gear units contained in housings 43r. It will be understood by those skilled in the art that the manipulation of lever 43c may be used to control the operation of the clutch element, and that lever 43g may be used to control the setting of the gears for the reverse operation of either propeller operated through the corresponding reverse gear unit. Housing 15a is adapted to be fixedly secured to extension 15q of the crank housing, thereby making available a supply of oil for the important speed-reducing gears derived from the same source as that used to supply lubrication for the moving parts of the engine proper.

The lower opening of the crank housing may be closed in the usual manner by means of crank pan 15p, which is fixedly secured to the crank housing casting by means of cap screws 15c, a cork gasket 15g being used to make the joint oil tight.

*The invention*

The elements in cooperative combination comprising the invention and responsible for the improvements achieved thereby, are piston 44, piston tube 45, yoke 46, wrist pins 47, guide bearing 48, guide rod 49r, guide rod support member 50, stud bolts 52s and nuts 52n, together with other related parts hereinafter enumerated.

The combination of co-acting parts comprising the invention are clearly illustrated in connection with the structure shown in Fig. 1, wherein it will be seen that instead of the usual long-skirted piston, I employ a piston 44 that may be made considerably shorter and lighter because side-wall pressures are reduced to a minimum, hence the piston need be only long enough to provide proper bearing surface for the small lateral forces produced while the combination comprising the invention is called upon to synchronize the two crankshafts and to transfer power from one crankshaft to the other.

The force produced by the explosion of the charge in combustion space 25c is transmitted from piston 44 through slender flexible piston tube 45, which preferably is provided with a plurality of apertures 45a in diametrically opposite sides of the tube to prevent the compression of air therein. Instead of removably securing the tubular element to the piston, I prefer to inseparably secure these two elements together by placing the tubular element in the mold for the piston, and then casting the piston around it so the metal of rib portions 44r will pass through apertures 45a', provided therefor, and join with the poured metal in the central portion of the tube to form a reinforced interior pin. The forces produced by the pistons then are transmitted directly to the end area of the tubular element, and also by means of the rivet-like portions of the piston metal that pass through the aforesaid apertures.

Preparatory to casting the piston tube in the piston element, a light yoke member 46, adapted to provide lugs for wrist pins 47, may be fixedly secured thereto by welding or brazing, thereby eliminating any unnecessary attachment elements, such as bolts and nuts, which add considerably to the weight of the reciprocating parts. The lower end of the piston tube may be expanded to provide a shoulder for one end of bearing sleeve 48, preferably retained in position by lightly peining the lower end of the tubular element over the end of said sleeve before the latter is reamed to its final bore.

Figure 3:
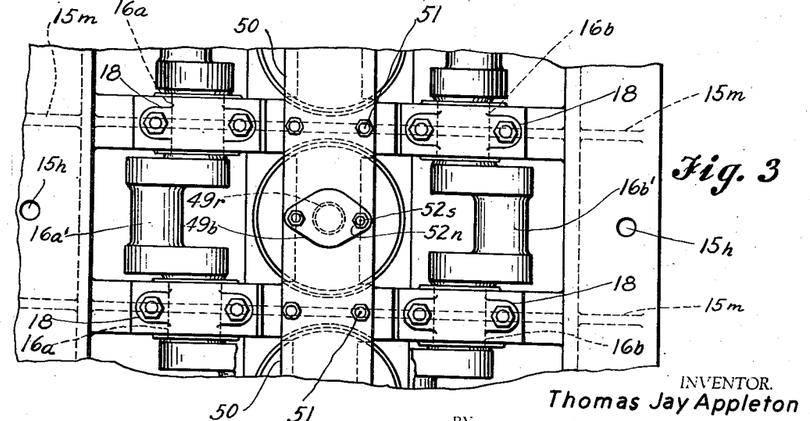
Fig. 3 is a bottom view taken below the cylinder of Fig. 1 with the crank pan and connecting rods removed.

In order to provide an adequate support for guide rod 49r, I provide a downward extension of web 15w, designated by numeral 15w' in line with each pair of crankshaft bearings, together with a suitable continuation of flange 15f, designated by the numeral 15f', to form an attachment element. The lower face of said attachment element is machined to accommodate guide-rod support member 50, which may be fixedly secured thereto by means of studs and nuts 51, as shown in Fig. 3. The guide rod preferably is provided with a lower portion 49a of larger diameter and a flange 49b, the latter having apertures adapted to pass over a plurality of studs 52s so the guide rod element may be removably secured to element 50 by means of nuts 52n.

The upper ends of connecting rods 53 may be slit and provided with suitable lugs for clamping the same to wrist pins 47 by means of bolts and nuts 53b in the usual manner. Near the lower bearing portion of each connecting rod, means may be provided for precisely adjusting its length to secure the same distance between centers as in the other connecting rod of the pair. The preferred means for accomplishing this adjustment is illustrated in Fig. 1, wherein the lower end of each connecting rod is shown provided with a pair of bosses 53c and a notch that articulates with an alignment projection 53d, preferably made integral with upper bearing element 53e. Said bearing element co-acts with bearing cap 53f to form the adjustable crank bearing of the connecting rod. Shims 53g may be inserted between the bearing elements to provide for adjustments necessitated by wear, and shims 53h may be varied in thickness to equalize the lengths of the dual connecting rods for each cylinder unit. Said shims 53h are readily removable one at a time for that purpose by removing and replacing first one of bolts 53k, and then the other.

It will be seen that these important elements are readily accessible from the bottom of the engine upon removal of pan 15p, as indicated in Fig. 1 in combination with Fig. 3 of the drawings, and that any or all of the pistons may be withdrawn from the bottom of the engine for inspection or repairs by removing bolts 53k to free the connecting rods from the cranks, then withdrawing guide rods 49r after removing nuts 52n, and finally removing the guide-rod support member after removing the nuts from studs 51.

Obviously the piston may be reinserted from the bottom and the several elements reassembled after the aforesaid inspection or repairs have been made.

Referring to Fig. 4 it will be seen that lightweight yoke 46 may provide supports for a pair of bronze bearing sleeves 46b for each connecting-rod wrist pin, holes 46h being provided for the splash lubrication of said bearings.

Particular attention is directed to the telescopic arrangement of the interior guide rod and exterior piston tube, and to the piston-tube guide bearing, at the lower end thereof, which slides upon the guide rod. This is an important differentiation from the combination of parts heretofore employed for dual crankshaft engines, and makes possible the important advantages achieved by my invention. Although piston tube 45 is required to transmit large forces during certain portions of the power stroke of the engine, it will be apparent from Fig. 1 that said forces are transmitted always in a straight line coincident with the direction of movement of the piston and tube, hence the tube acts in the nature of a centrally loaded column for the transmission of said forces to the yoke element, where components thereof are in turn transmitted to the connecting rods by means of the wrist pins. The interior guide rod may be relied upon to prevent any serious lateral deflection of the piston tube under abnormal maximum forces, by providing only a minimum amount of clearance between the outer surface of the guide rod and the inner surface of said tube above the guide bearing. While this is not of particular importance in supporting the piston tube during the power stroke, it is an important factor in providing a factor of safety for the piston tube in connection with the transfer of forces from one crankshaft to the other in multiple-cylinder engines, as hereinafter more fully explained.

The lateral components of the forces transmitted by the dual connecting rods obviously balance each other. As the piston tube transmits only the net amount of force imparted to the pistons by the exploding charge of the cylinder, plus whatever inertia forces may be developed in piston 44 and piston rings 44a, and in the upper portion of the piston tube itself, it is found that said piston tube may be made of thin-wall high-strength alloy steel tubing, so that the combined weight of the short-skirt piston and tube together with the light-weight wrist-pin yoke is considerably less than that of the conventional trunk-type piston having heavy bosses and bearing bushings for a single wrist pin large enough to transmit the total piston forces.

The internal disposition of the guide rod makes possible the positioning of my light-weight wrist-pin yoke in such relation to the piston and crankshafts, that I am enabled to use connecting rods very much shorter than those heretofore employed. This is because the improvement makes possible a minimum horizontal distance between the centers of the main bearings. It is only necessary to provide clearance between the bosses of the lower ends of the connecting rods and the slender piston tubing for the up stroke of the engine, hence the favorable relation of the wrist-pin bearings in the yoke element with reference to the center of the crankshaft and the absence of any exterior guide bearings for the piston rod, enable me to use very short connecting rods. Connecting rods having a length from center to center of bearings equal to the stroke of the piston may be incorporated in the design, as illustrated in the drawings. As a result of this improved relation, the connecting rods during the power stroke of the engine constitute a powerful toggle mechanism, in contrast to the usual trunk-piston-connecting-rod arrangement of parts of the conventional single crankshaft engine.

Figures 5A, 5B:
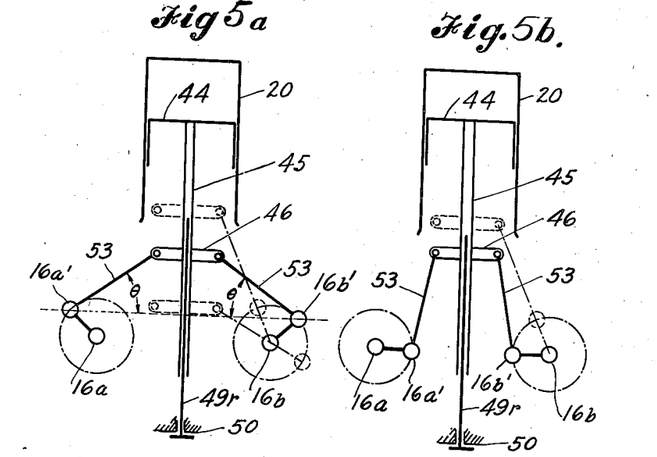

It will be apparent to those skilled in the science of mechanics that the arrangement of dual connecting rods, yoke and piston tube shown in Fig. 5a comprises a very effective toggle mechanism by reason of the small angles $\theta$, it being well known that the relation between the force transmitted by the tubular piston to the component of force transmitted through each of the dual connecting rods to the cranks of the dual crankshafts, is given by the formula $F = T \div 2$ sine $\theta$, wherein F represents the force in each connecting rod, T equals the force transmitted by the piston tube, and $\theta$ is the angle between the center line of each connecting rod and a line through the crank centers. Hence the sum of the forces transmitted by the two connecting rods is equal to the force in the piston tube divided by the sine of angle $\theta$.

For the position of the cranks illustrated in Figs. 1 and 5a, angle $\theta$ is 33 degrees, and the sine of $\theta$ is 0.5446; therefore, 2F (the sum of the forces in the two connecting rods) equals $T \div 0.5446$, or 1.836 times T. In other words, the mechanical advantage of the aforesaid toggle mechanism for the position of the cranks shown in Fig. 1 (70 degrees from top dead center) is 1.836. This means that the force exerted by the piston is multiplied by 1.836 for the two connecting rods, or by 0.918 for each connecting rod; and these increased forces in the connecting rods are applied to the dual cranks to increase the turning effort, or torque, imparted to the two crankshafts, and this without cylinder side-wall friction such as occurs in standard single crankshaft engines.

In contrast to the toggle effect during the power stroke, attention is directed to the nearly vertical positions of the connecting rods for a corresponding crank angle from top dead center during the compression stroke, as illustrated by the diagram in Fig. 5b.

Figure 6:
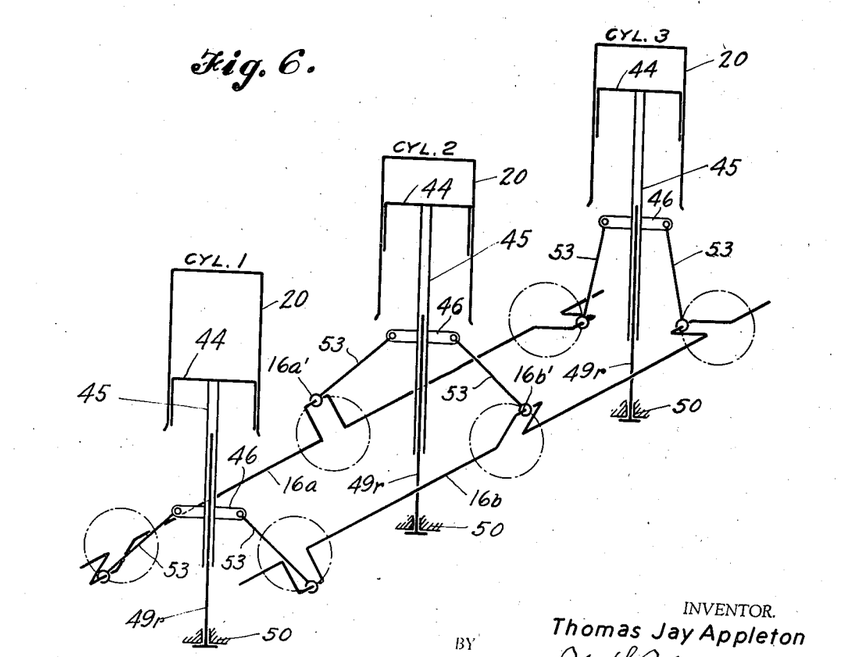
Fig. 6 is a diagrammatic representation of the relative positions of the pistons, connecting rods and cranks in a three-cylinder engine comprising the invention to illustrate the cooperative action of the several parts, whereby the synchronization of the two crankshafts and the transfer of power from one crankshaft to the other are accomplished.

Fig. 6 is a diagrammatic representation of the co-acting elements of the invention as applied to the first three cylinders of the six-cylinder engine illustrated in Fig. 2. It is also a diagrammatic representation of the relative arrangement of parts in a three-cylinder engine, the firing order of which is 1—3—2. The firing order in the six-cylinder engine may be 1—5—3—6—2—4, from which it will be seen that the first three cylinders, as a group, may fire in the aforesaid order 1—3—2. In this diagram cylinder 3 has its cranks in their respective horizontal positions; cylinder 2 has its cranks displaced 30 degrees from the upper vertical, or 120 degrees from those of cylinder 3; and the cranks of cylinder 1 are displaced 30 degrees from the lower vertical, or 120 degrees from the cranks of cylinder 3; hence, the cranks of cylinders 1 and 2, likewise, are displaced by 120 degrees. If we assume that cylinder 2 is in its power stroke for the position shown, then, for a four-cycle engine, cylinder 1 is starting its compression stroke, and cylinder 3 is in the midst of its exhaust stroke. It will be apparent that the forces transmitted by the connecting rods in the position shown for cylinder 1 will be small, because the compression and inertia forces, required early in the compression stroke of that cylinder, are very small in comparison with the forces transmitted by the connecting rods in the power stroke of cylinder 2, as will be seen by the type curves of Fig. 7. Likewise, it will be obvious that the work used by cylinder 3 for the exhaust stroke is comparatively still smaller, so its connecting rods also transmit comparatively small forces.

From the foregoing it will be seen that a portion of the power developed by cylinder 2 during the first part of its power stroke is transmitted directly by the crankshafts to the other two cylinders to furnish the power required by those cylinders for their then light-duty strokes. When the cranks of cylinder 2 reach their outward horizontal positions in the down stroke, the cranks of both cylinder 1 and cylinder 3 will be in their up strokes. The cylinder bores, guide rods, reciprocating members and connecting rods of a multiple cylinder engine will be seen to provide a nicely balanced linkage mechanism connecting the several cranks of the two crankshafts, wherein there always is at least one crank in its up stroke and another in its down stroke, and this holds true while the remaining crank is at or near its upper or lower dead center positions. Consequently said linkage mechanism co-acts to synchronize the two crankshafts. It also is particularly effective in transferring power from the less loaded to more loaded crankshaft. This is because the positions of the connecting rods of the cranks in their up strokes, being nearly vertical, are particularly effective in transmitting forces from the cranks of the less loaded crankshaft to the corresponding cranks of the more loaded crankshaft through the intermediacy of their respective wrist pins and yoke elements, piston tubes, and pistons and guide bearings. The distance between the wrist pins being small, very large forces thus may be transmitted with small side-wall loadings between the respective pistons and cylinder walls, and between the guide bearings and guide rods.

The favorable relation of moving parts for force transference shown for cylinder 3 of Fig. 6 continues for each cylinder unit through a considerable angle before and after the ideal position therein indicated, so that by the time the angular displacement of the cranks from said ideal position for one cylinder becomes objectionable, the burden of force transference is taken up by the cranks and connecting rods of another cylinder; thereby assuring a continuance of force transmission from the piston of the cylinder on the power stroke to both crankshafts, and then the transference of force in turn from the less loaded to the more loaded crankshaft by the corresponding elements of the other cylinder units of the engine.

So long as the power output of both shafts is the same, the connecting rods for each cylinder unit will transmit equal forces and the cylinder bore and guide rod serve merely as guides for the reciprocating movement of the piston and piston-tube guide bearing, respectively. When the power output of the two crankshafts is unbalanced, however, the amount and direction of forces transmitted by each pair of connecting rods, not in their power strokes, will vary depending upon the forces required for the operation of the reciprocating parts and the force required to be transmitted from the crankshaft with the less load to the crankshaft having the more load. By operating cam shaft 27 from one of the crankshafts and generator 36 from the other crankshaft, this load transference is a minimum when the engine is carrying no other load.

It will be apparent to those skilled in the art that the six-cylinder engine illustrated in Fig. 2 has overlapping power strokes for a small fraction only of each revolution, so during the main portion of the power stroke of each cylinder there will be available the aforesaid connecting rod linkages of the other five cylinders for the transference of forces from one crankshaft to the other.

The arrangement and proportions of the coacting parts permit the slender piston tube to act as a centrally loaded beam, the deflection of which under transverse loads plus the variation in thickness of the oil films of the main and crank bearings of the crankshaft maintained by the well-known pressure system of lubrication, are sufficient to compensate for reasonable differences in the lengths of the connecting rods due to wear in the bearings, thus assuring the transmission of components of the piston forces to both crankshafts. The guide rod in effect is a cantilever beam. Its deflections under side loadings also assist the piston tube in compensating for the aforesaid differences in the lengths of the connecting rods due to wear.

In connection with Fig. 2 it was explained that the engine was adapted to drive twin screws for a boat through the intermediacy of speed-reducing gears 41a and 41b, and clutch and reverse gear units 43r, the propeller shafts being attached to flanges 42. It will be apparent from the foregoing explanation of the manner in which forces are transmitted to and derived from the crankshafts illustrated in Fig. 6, that power, produced by the power strokes of the several cylinders of the engine shown in said Fig. 2, is transmitted from each crankshaft through the intermediacy of the said reducing gearing and clutch units to the twin screws of the vessel.

In maneuvering the vessel, at times it is desirable to use either, but not both, of the propellers. This feature is particularly important for fishing boats of the troller type when they are operating on a course quartering of the wind and waves. It is also very important from the standpoint of safety in connection with the operation of such craft, which often must work comparatively close to the shore, and at times experience damage to, or loss of, a propeller due to striking submerged rocks or other obstruction. In such cases my invention enables the entire power output of the engine to be delivered to the undamaged propeller by disconnecting the clutch of the faulty propeller until such time as the necessary repairs can be made.

From the foregoing it will be apparent that the invention elements also will function to transfer a portion of the torque received by shaft 16a from starting motor 39 over to shaft 16b, while the engine is being started.

Advantages

Figure 7:
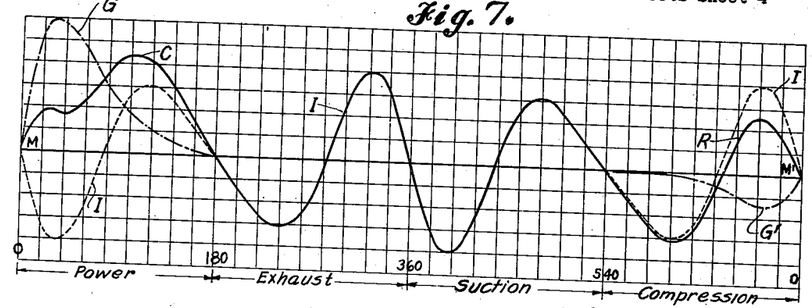
Fig. 7 is a diagram showing the variation in turning effort due to cylinder pressure and inertia forces, and the algebraic combination thereof for a conventional four-cycle internal combustion engine.

The diagram of Fig. 7 represents the turning effort curves for the successive events occurring in each cylinder of an internal combustion engine of standard construction. The turning effort, or tangential component of the connecting-rod force on the crank of the crankshaft, is represented by the ordinates of the curves, each horizontal space of the diagram corresponding to an interval of 20 degrees of crankshaft rotation. Curve G represents the turning effort due to the gas pressure in the cylinder, curve I represents the turning effort due to inertia, and curve C represents the combined turning effort resulting from the joint operation of gas pressure and inertia forces.

It is the function of the fly-wheel to maintain a uniform mean turning effort having a relative magnitude represented by the heavy line M—M'. Those portions of curve C above line M—M', therefore, represent surplus energy which is stored in the fly-wheel and other moving parts for a portion of the power stroke, and then given up in those portions of the four-stroke cycle where there is a deficiency of turning effort, as indicated by the portions of said curve under the mean ordinate line. Reference will be made to said diagram in pointing out the advantages derived from the employment of my invention.

During the power stroke the turning effort produced by the expanding gas in the cylinder after the explosion occurs is greatly in excess of that required to maintain the mean turning effort at the level M—M', hence a large portion of the excess energy is stored in the fly-wheel and other moving parts, as represented by the portion of curve I below said line M—M' during the first seventy-odd degrees of crank rotation from top dead center. Thereafter, because of the diminishing values of turning effort derived from the expanding gas, the turning effort due to the inertia forces combines with the turning effort then resulting from the expanding gas to produce the total turning effort required to maintain the mean turning effort at the required level during the remainder of the power stroke, and also during the subsequent increase and decrease in the turning effort derived from the inertia forces to respectively accelerate and decelerate the reciprocating parts for the exhaust and suction strokes.

During the initial part of the compression stroke, the acceleration of the reciprocating parts requires an increasing amount of force due to inertia for the first 60 degrees of crank rotation, during which time there may be a slight negative gas pressure in the cylinder as the result of the preceding suction stroke. Because of the increasing compression pressure, the demand on the turning effort due to the inertia forces increases to a maximum value at about 40 degrees before top dead center, as represented by the curve I, the drag, or negative turning effort, required to be supplied by said inertia forces being represented by the curve G', hence the resulting effective turning effort during the compression stroke is seen to be reduced as indicated by the curve R.

From the foregoing it will be seen that the resulting turning effort may be increased for a given engine only by increasing the input turning effort represented by the curve G or by reducing the turning effort required for the compression of the fresh charge, represented by said curve G', or by both. Obviously it is the duty of the fly-wheel to absorb and deliver energy during the periods of fluxuation in torque effort represented by the curve C, and likewise anything that will lighten the weights of the reciprocating parts will reduce the severity of fluxuation in said curve C, thereby raising the height of the low points in the curve during the exhaust, suction and compression strokes, during which there is the greatest tendency for the engine to stall, particularly when subjected to additional torque effort required to meet increased power demand on the engine.

Figure 8:
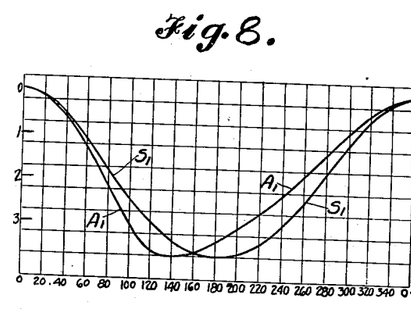
Fig. 8 is a diagram showing the variation in piston positions for various crank angles in an engine comprising the invention as compared with those of a conventional engine of equal stroke.

The curves of Fig. 8 illustrate the variation in positions of the piston in its movement downward from, and returning to, top dead center for various angular crank positions during a complete revolution of the crankshaft for a standard single crankshaft engine, and for a dual crankshaft engine comprising my improvements, respectively. The vertical scale represents inches of movement of the piston from its extreme upper position, and the horizontal scale represents the angular displacement of the engine crank from top dead center. Curve $S_1$ is for an engine of standard construction having a total piston travel of 3.75 inches, and a single connecting rod with a length of 6.75 inches. Curve $A_1$ is for the engine illustrated in Fig. 1 for the same length of stroke. Said diagram indicates the basis for the increased mechanical advantage resulting during the power stroke of the engine, and likewise the reduction in the turning effort required to compress the charge during the compression stroke, as illustrated in Figs. 10a and 10b, hereinafter more fully explained.

Attention is directed to the fact that although both engines have the same length of stroke, my improved engine completes its stroke from top dead center to bottom dead center in 140 degrees, as indicated by the corresponding positions of wrist-pin yoke, connecting rods and cranks in Fig. 5a, whereas 180 degrees of crank movement is required to complete the downward stroke of the standard single-crankshaft engine.

Figure 9:
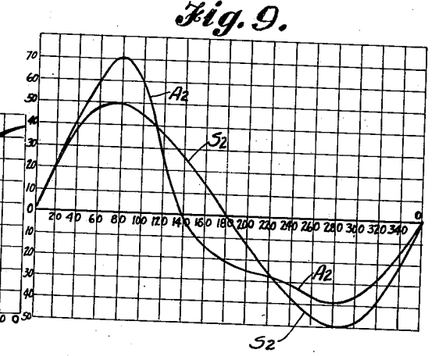
Fig. 9 is a diagram for comparing the piston velocities for various crank positions in the aforesaid engines.

The curves of the diagram in Fig. 9 show the variation in the instantaneous values of piston velocity in feet per second for the corresponding crank displacement angles shown in Fig. 8, curve $S_2$ indicating the piston velocity of the aforesaid standard engine, and curve $A_2$ the corresponding velocity values for the engine of Fig. 1. The height of curve $A_2$ in contrast to that of curve $S_2$ for the down stroke of the piston, again is indicative of the mechanical advantage effective in producing an increase inturning effort during the power stroke. Likewise, the greater number of degrees of crank movement required to complete the return of the piston accounts for the increase in mechanical advantage derived by my improved construction during the upstroke.

Figure 10A:
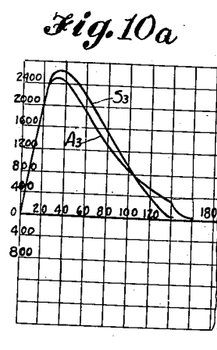
Figs. 10a and 10b are diagrams comparing the torque values for various crank positions during the power and compression strokes, respectively, of the engines compared in Fig. 8.
Figure 10B:
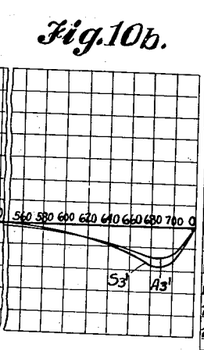

Curve $S_3$ in Fig. 10a shows the variation in turning effort for various angular positions of the crank from top dead center for the aforesaid standard engine, it being assumed that the exhaust valve opens at 140 degrees from top dead center in conformity with standard practice for four-cycle engine operation. Curve $A_3$ represents the variation in turning effort for the engine of Fig. 1 for the same bore and stroke as the standard engine of curve $S_3$, with the exhaust valve opening at the end of the power stroke, namely 140 degrees, as shown clearly in Figs. 8 and 9.

Although curves $S_3$ and $A_3$ appear to coincide for the first 23 degrees of crank movement in Fig. 10a, in reality there is a slight separation which cannot be illustrated in said Fig. 10a with such small vertical and horizontal scales. Those portions of curves T and P between 0 and 23 degrees in Fig. 11a, however, do indicate the algebraic torque difference and torque difference percent, respectively, for said curves $S_3$ and $A_3$ during this angular crank movement of the power stroke, as hereinafter explained. Curves $S_3$ and $A_3$ are plotted from calculated values on the basis of the compressed charge having been fully ignited exactly at top dead center.

In Fig. 10b curve $S_3'$ shows the variation in torque effort during the compression stroke while compressing the fresh charge to the prescribed pressure preliminary to its ignition for the power stroke to follow. Likewise curve $A_3'$ illustrates the variation in torque effort required to compress the fresh charge to the same pressure and through the same length of stroke as for the standard engine of curve $S_3'$. The same vertical scale applies to both Figs. 11a and 11b, wherein the numerals indicate turning effort or torque in pound-inches, and the horizontal scale is for degrees of crank movement from top dead center, the break between the two groups of curves being indicative of the omission of the intervening exhaust and suction strokes.

Figure 11A:
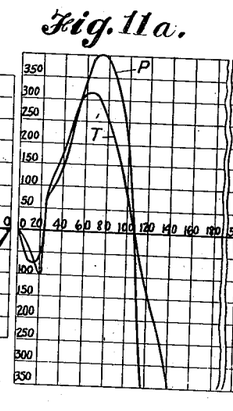
Figs. 11a and 11b are diagrams showing the variation in torque difference and in torque difference percent for the power and compression strokes, respectively, of the aforesaid engines, taken from the torque curves of Figs. 10a and 10b, but plotted to larger vertical scales.

Curve T of Fig. 11a illustrates the difference in torque values measured vertically between curves $A_3$ and $S_3$ of Fig. 11a for corresponding horizontal scale values of crank movement from top dead center, but plotted to a different vertical scale of pound-inches of torque. By dividing the said torque difference value, for a given crank position, by the corresponding instantaneous torque value of the standard engine and multiplying by 100 percent, we obtain curve P plotted in terms of the vertical scale of torque difference percent shown to the right in Fig. 11b.

Figure 11B:
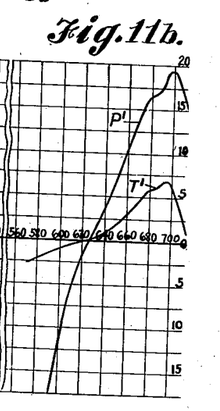

Similarly in Fig. 11b, curve T' illustrates the difference in torque values between curves $S_3'$ and $A_3'$ of Fig. 10b for various crank-angle positions occurring during the compression stroke in terms of the scale to the left in Fig. 11a. Curve P' shows the corresponding variation in torque difference percent values for the compression stroke, derived in the same manner as for curve T in Fig. 11a.

By reason of the toggle-like arrangement of the connecting rods and yoke member through which the piston forces are transmitted from the piston tube to the cranks, together with the small angular displacement of said connecting rods from the horizontal, the torque values in my improved engine, in comparison with the corresponding torque values of a conventional engine of equal bore and stroke and operating with the same compression and explosion pressures, are found to be substantially increased during the intermediate portions of the power stroke while the cylinder pressures are high, and are materially decreased during the latter portions of the compression stroke while the turning effort is being derived from the inertia forces of the moving parts. This increase in mechanical advantage substantially increases the "lugging" ability of the engine to carry high-torque loads at relatively slow crankshaft speeds. Obviously, where six cylinders are employed, as illustrated in Fig. 2 of the drawings, at least one of the cylinders of the engine at all times is transmitting force to the dual crankshafts through the highly effective toggle arrangement of connecting rod and crank elements, thereby greatly increasing the resistance of the engine to "stalling" under suddenly applied high-torque loads, such as occur while accelerating heavily loaded boats or vehicles.

By virtue of the shorter crank throws and connecting rods, together with the lighter reciprocating elements, an engine incorporating my improvements is able to operate at higher speeds, in addition to its ability to "lug" under heavy torque loads, and for this reason it is particularly adapted for operating loads demanding high initial accelerating torques, followed by higher engine speeds.

With the dual crankshafts rotating in opposite directions and the connecting rods made very short, I am able to employ the well known crankshaft counter-weights, not shown, to more nearly eliminate the vibration due to the connecting rods. By minimizing the weight of the piston, piston tube and wrist-pin yoke, the vertical vibration is greatly reduced in single-cylinder engines employing my improved construction, and this permits high-speed operations when the conditions surrounding the employment of the engine necessitate high speeds.

Although the sum of the forces transmitted by the two connecting rods is much greater than that transmitted by the connecting rod of a single crankshaft engine of standard construction, the much greater surface areas provided by the two sets of wrist-pin, connecting-rod and main bearings, make possible ever smaller pressures per unit of bearing surface.

There also is the very decided advantage of using either or both of the crankshafts to deliver the power output of the engine. Said advantage is of particular importance for the operation of twin propellers for power boats from a single dual crankshaft engine through the intermediacy of speed reducing gears and clutches. This applies especially to fishing boats of the troller type, which are required to operate close to shore for long periods of time on courses quartering of the wind and waves, and which all too frequently damage or lose one of their propellers.

Provision has been made for equalizing the lengths of the connecting rods for a given cylinder, as hereinbefore explained. Because of the flexibility of the piston tube, its deflections under transverse loadings automatically compensate for any reasonable differences that may develop in the lengths of the two connecting rods for a given cylinder due to reasonable wear, thereby assuring the transmission of components of the piston force for a given cylinder to both crankshafts and tending to equalize the wear of said bearings.

Considerable equalization is effected by the variation in thickness of the oil films of the bearings comprised by the improvement, especially where liberal bearing fits and pressure lubrication are used.

The co-acting elements of the invention also function in multiple-cylinder engines to synchronize the crankshafts and to transfer power from one crankshaft to the other, so the entire output may be derived from either of the engine shafts without the use of the objectional synchronizing gears heretofore required in dual crankshaft engines.

While I have illustrated and described my improvement in a preferred form as applied to a marine-type gasoline engine, it will be apparent to those skilled in the art that the combination of coacting elements comprising my invention may be adapted and applied to other types of gasoline engines. Said combination also is particularly effective when applied to Diesel engines, because of the decided mechanical advantage derived thereby during the compression stroke. Said mechanical advantage enables the required high-compression pressures to be obtained with lighter fly-wheels.

Although the invention is illustrated and described as applied to four-cycle internal combustion engines, it will be understood that the improvement is applicable also to two-cycle Otto and Diesel cycle engines where the scavenging air is derived from an auxiliary compressor cylinder or other source now in common practice, because of the obviously more favorable compression and scavenging strokes.

The advantages hereinbefore set forth are based on a comparison made between engines having the same bore and stroke. This necessitates the use of shorter cranks for my preferred construction as compared with those for the single crankshaft engine.

Said advantages are increased by lengthening the stroke of the piston to give the same crank length as the standard engine, as my improved construction with its ultra short connecting rods then provides higher compression pressures and greater volumetric efficiency.

Having illustrated and described my invention and the advantages derived thereby, what I claim as new and desire to protect by Letters Patent is:

1. In an engine, the combination of a crank case, dual crankshafts rotatively mounted in said crank case, a power cylinder fixedly secured at one end to said crank case, a reciprocating piston in said cylinder, a piston tube fixedly secured to said piston at one end, an interior guide bearing fixedly secured in said piston tube at its other end, guide rod means for said interior guide bearing fixedly anchored at one end to said crank case, yoke means comprising duel wrist pins fixedly secured to said piston tube intermediate of said piston and said guide bearing, and dual connecting rods for operatively joining said dual wrist pins with the respective cranks of said dual crankshafts.

2. In an engine, the combination of a crank case, dual crank shafts rotatively mounted in said crank case, a power cylinder fixedly secured at one end to said crank case, a reciprocating piston in said cylinder, a piston tube fixedly secured to said piston at one end, an internal guide bearing fixedly secured in said piston tube at the other end thereof, a guide rod member for said guide bearing adapted to telescope within said piston tube, means for removably anchoring said guide rod member to said crank case, wrist-pin yoke means fixedly secured to said piston tube intermediate of said piston and said guide bearing, dual wrist pins in said yoke means, and dual connecting rods for operatively joining said wrist pins with the respective cranks of said dual crankshafts.

3. In an engine, the combination of a crank case, dual crankshafts rotatively mounted in said crank case, a power cylinder fixedly secured at one end to said crank case, a piston tube comprising an interior guide bearing fixedly secured in said piston tube at one end thereof, a piston for said cylinder comprising a cast rigid connection with the other end of said piston tube, wrist-pin yoke means fixedly secured to said piston tube intermediate of said piston and said guide bearing, dual wrist pins in said yoke means, a guide rod for said guide bearing adapted to telescope within said piston tube, means for removably anchoring said guide rod to said crank case and dual connecting rods for operatively joining said wrist pins with the corresponding cranks of said dual crankshafts 4. In an engine, the combination of a crank case, dual crankshafts rotatively mounted in said crank case, a power cylinder fixedly secured at one end to said crank case, a piston reciprocatively mounted in said cylinder; a piston tube having a plurality of apertures through the wall thereof, expanded for a portion of its length at one end and rigidly connected to said piston at its other end; an interior guide bearing fixedly secured in the expanded portion of said piston tube, wrist-pin yoke means comprising dual wrist pins fixedly secured to the exterior of said piston tube intermediate of said piston and said expanded portion, a guide rod for said guide bearing, means for removably anchoring one end of said guide rod to said crank case, and dual connecting rods operatively joining said dual wrist pins with the respective cranks of said dual crankshafts.

5. In a dual crankshaft engine, the combination of a crank case, dual crankshafts rotatively mounted in said crank case, a power cylinder fixedly secured at one end to said crank case, a piston reciprocatively mounted in said cylinder, a piston tube having a plurality of apertures through the wall thereof and rigidly connected to said piston at one end, an interior guide bearing fixedly secured in the other end of said piston tube, wrist-pin yoke means fixedly secured to said piston tube intermediate of said piston and said guide bearing, dual wrist pins in said yoke means, a guide rod for said guide bearing adapted to telescope within said piston tube, means for fixedly anchoring the other end of said guide rod to said crank case, and dual connecting rods operatively joining said dual wrist pins to the cranks of said dual crankshafts.

6. In a dual crankshaft engine, the combination of a crank case, dual crankshafts rotatively mounted in said crank case, a power cylinder fixedly secured at one end to said crank case, a piston reciprocatively mounted in said cylinder, a piston tube comprising an interior guide bearing at one end and rigidly connected to said piston at its other end, wrist-pin yoke means fixedly secured to the exterior of said piston tube intermediate of said piston and said guide bearing, dual wrist pins in said yoke member, an apertured anchor member fixedly secured to said crank case, a guide rod inserted in the aperture of said anchor member to serve as a guide for said guide bearing, means for fixedly securing said guide rod to said anchor member, and dual connecting rods for operatively joining said dual wrist pins with the corresponding cranks of said dual crankshafts.

7. In an engine of the class described, the combination of a crank case, dual crankshafts rotatively mounted in said crank case, a power cylinder fixedly secured at one end to said crank case, a reciprocative piston in said power cylinder, a piston tube expanded for a portion of its length at one end and rigidly secured to said piston at its other end, an interior guide bearing fixedly secured in the expanded portion of said guide tube, a yoke member comprising bearing means fixedly secured to the exterior of said piston tube intermediate of said expanded portion and said piston, dual wrist pins operatively mounted in the bearing means of said yoke member, an anchor member fixedly secured to said crank case, a guide rod for said guide bearing comprising a flange at one end and removably secured thereby to said anchor member, and dual connecting rods joining said dual wrist pins with the corresponding cranks of said dual crankshafts.

8. In an engine of the class described, the combination of a crank case, dual crankshafts rotatively mounted in said crank case, a power cylinder fixedly secured at one end to said crank case, a piston reciprocatively mounted in said cylinder, a piston tube expanded for a portion of its length at one end and rigidly connected to said piston tube at its other end, a guide bearing fixedly secured in the expanded portion of said piston tube, a yoke member comprising dual pairs of wrist-pin bearings fixedly secured to said piston tube intermediate of said expanded portion and said piston, dual wrist pins operatively mounted in the bearings of said yoke means, an apertured anchor member fixedly secured to said crank case, a guide rod comprising a flange at one end and inserted in the aperture of said anchor member to serve as a guide for the guide bearing in said piston tube, means for fixedly securing said flange to said anchor member, and dual connecting rods for operatively joining said dual wrist pins with the corresponding cranks of said dual crankshafts.

9. In an engine of the class described, the combination of a crank case comprising a plurality of pairs of crankshaft bearings and attachment means for an anchor member in substantial alignment with each pair of said bearings, dual crankshafts rotatively positioned in the bearings of said crank case, a power cylinder fixedly secured at one end to said crank case; a reciprocating element comprising a piston tube expanded for a portion of its length at one end, a piston for said cylinder comprising a cast rigid connection with the other end of said piston tube, an interior guide bearing fixedly secured in the expanded portion of said piston, yoke means fixedly secured to the exterior of said piston tube intermediate of said piston and said expanded portion, and dual wrist pins in said yoke means; an anchor member fixedly secured to the attachment means of said crank case and providing an aperture coaxial with said piston tube, a guide rod for the guide bearing of said reciprocating element inserted in the said aperture of said anchor member and fixedly secured thereto, and dual connecting rods for operatively joining the dual wrist pins in said yoke member with the corresponding cranks of said duel crankshafts.

10. In a multiple-cylinder internal combustion engine, the combination of a crank case, dual crankshafts comprising cranks for one cylinder disposed at an angle with the corresponding cranks for other cylinders rotatively mounted in said crank case, a plurality of power cylinders each having one end fixedly secured to said crank case, a piston within each of said power cylinders, a piston tube comprising an interior guide bearing at one end for each of said pistons and fixedly secured thereto at its other end, a wrist-pin yoke member fixedly secured to the exterior of each said piston tube intermediate of said guide bearing and said piston, dual wrist pins operatively mounted in each said yoke member, and connecting-rod means for operatively connecting the dual wrist pins of each said yoke member with the corresponding cranks of said crankshafts, whereby the rotation of said dual crankshafts is synchronized and power from the less loaded crankshaft is transferred to the more loaded crankshaft.

THOMAS JAY APPLETON.